US006622236B1

United States Patent
Chiarot et al.

(10) Patent No.: US 6,622,236 B1
(45) Date of Patent: Sep. 16, 2003

(54) MICROPROCESSOR INSTRUCTION FETCH UNIT FOR PROCESSING INSTRUCTION GROUPS HAVING MULTIPLE BRANCH INSTRUCTIONS

(75) Inventors: Kevin Arthur Chiarot, Pine Bush, NY (US); Brian R. Konigsburg, Austin, TX (US); Dave Stephen Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,229

(22) Filed: Feb. 17, 2000

(51) Int. Cl.$^7$ ................................................. G06F 9/30

(52) U.S. Cl. ...................... 712/206; 712/237; 712/239

(58) Field of Search ............................... 712/237, 238, 712/1, 239, 206

(56) References Cited

U.S. PATENT DOCUMENTS

| | | | | |
|---|---|---|---|---|
| 5,796,998 A | * | 8/1998 | Levitan et al. | 712/239 |
| 5,809,268 A | * | 9/1998 | Chan | 712/200 |
| 6,256,727 B1 | * | 7/2001 | McDonald | 712/235 |
| 6,256,729 B1 | * | 7/2001 | Cherabuddi et al. | 712/238 |
| 6,282,663 B1 | * | 8/2001 | Khazam | 713/320 |
| 6,289,441 B1 | * | 9/2001 | Talcott et al. | 712/239 |
| 6,304,960 B1 | * | 10/2001 | Yeh et al. | 712/236 |

* cited by examiner

Primary Examiner—Eddie Chan
Assistant Examiner—Charles Harkness
(74) Attorney, Agent, or Firm—Joseph P. Lally; Leslie A. Van Leeuwen

(57) ABSTRACT

A microprocessor, data processing system, and an associated method of executing microprocessor instructions and generating instruction fetch addresses are disclosed. The microprocessor includes an instruction fetch unit comprising and instruction fetch address register (IFAR) and an instruction processing unit (IPU). The IFAR is configured to provide an address to an instruction cache. The IPU is suitable for receiving a set of instructions from the instruction cache and for generating an instruction fetch address upon determining from the set of instructions that the program execution flow requires redirection. The IPU is adapted to determine that the program flow requires redirection if the number of branch instructions in the set of instructions for which branch instruction information must be recorded exceeds the capacity of IPU to record the branch instruction information in a single cycle. The IPU may include an address generation unit suitable for generating a set of branch target addresses corresponding to the set of received instructions and a multiplexer configured to receive as inputs the set of branch target addresses. The output of the multiplexer is provided to the instruction address fetch register. The IPU may include an address incrementer suitable for generating a next instruction address corresponding to the next sequential instruction address following the instruction address corresponding to the received set of addresses. In this embodiment, the next instruction address comprises an input to the multiplexer. The IPU may further include selector logic adapted to select the next instruction address as the output of the multiplexer if the number of branch instructions in the set of instructions for which branch instruction information must be recorded exceeds the capacity of IPU to record the branch instruction information in a single cycle. The selector logic is adapted to select as the output of the multiplexer the branch target address of the first instruction predicted to be taken if the number of branch instructions in the set of instructions for which branch instruction information must be recorded does not exceed the capacity of IPU to record the branch instruction information in a single cycle.

24 Claims, 3 Drawing Sheets

MICROPROCESSOR INSTRUCTION FETCH UNIT FOR PROCESSING INSTRUCTION GROUPS HAVING MULTIPLE BRANCH INSTRUCTIONS

BACKGROUND

1. Field of the Present Invention

The present invention generally relates to the field of microprocessor architecture and more particularly to an efficient design for a branch unit in a gigahertz processor to improve performance.

2. History of Related Art

Branch instructions determine the instructions that a processor or central processing unit (CPU) of a data processing system will execute following execution of the branch instruction. Branch instructions introduce complexity into the instruction fetching process that typically negatively affects the processor performance. Previous methods of minimizing the performance penalty associated with branch instructions are disclosed in U.S. Pat. No. 5,796,998 entitled Apparatus and Method for Performing Branch Target Address Calculation and Branch Prediciton [Sic] In Parallel in an Information Handling System, which is assigned to the assignee of the present invention and is incorporated by reference herein. With the advent of the extremely high speed processors (i.e., processors operating with a clock frequency that exceeds 1 GHz), it is becoming increasingly difficult to identify the branch instructions in any set of instructions retrieved from an instruction cache, extract necessary branch target information from these instructions, and provide, if necessary, an address to the instruction fetch unit if the program flow requires redirection, all within the timing constraints of the system. Therefore, it is desirable to provide a microprocessor with an instruction fetch unit that is capable of achieving these objectives without significantly increasing the size or complexity of the microprocessor.

SUMMARY OF THE INVENTION

A microprocessor, data processing system, and an associated method of executing microprocessor instructions and generating instruction fetch addresses are disclosed. The microprocessor includes an instruction fetch unit comprising and instruction fetch address register (IFAR) and an instruction processing unit (IPU). The IFAR is configured to provide an address to an instruction cache. The IPU is suitable for receiving a set of instructions from the instruction cache and for generating an instruction fetch address upon determining from the set of instructions that the program execution flow requires redirection. The IPU is adapted to determine that the program flow requires redirection if the number of branch instructions in the set of instructions for which branch instruction information must be recorded exceeds the capacity of IPU to record the branch instruction information in a single cycle. The IPU may include an address generation unit suitable for generating a set of branch target addresses corresponding to the set of received instructions and a multiplexer configured to receive as inputs the set of branch target addresses. The output of the multiplexer is provided to the instruction address fetch register. The IPU may include an address incrementer suitable for generating a next instruction address corresponding to the next sequential instruction address following the instruction address corresponding to the received set of addresses. In this embodiment, the next instruction address comprises an input to the multiplexer. The IPU may further include selector logic adapted to select the next instruction address as the output of the multiplexer if the number of branch instructions in the set of instructions for which branch instruction information must be recorded exceeds the capacity of IPU to record the branch instruction information in a single cycle and there are no prior predicted taken branches in the instruction set. Otherwise, the selector logic is adapted to select as the output of the multiplexer the branch target address of the first instruction predicted to be taken.

BRIEF DESCRIPTION OF THE DRAWINGS

Other objects and advantages of the invention will become apparent upon reading the following detailed description and upon reference to the accompanying drawings in which.

Figure 1:
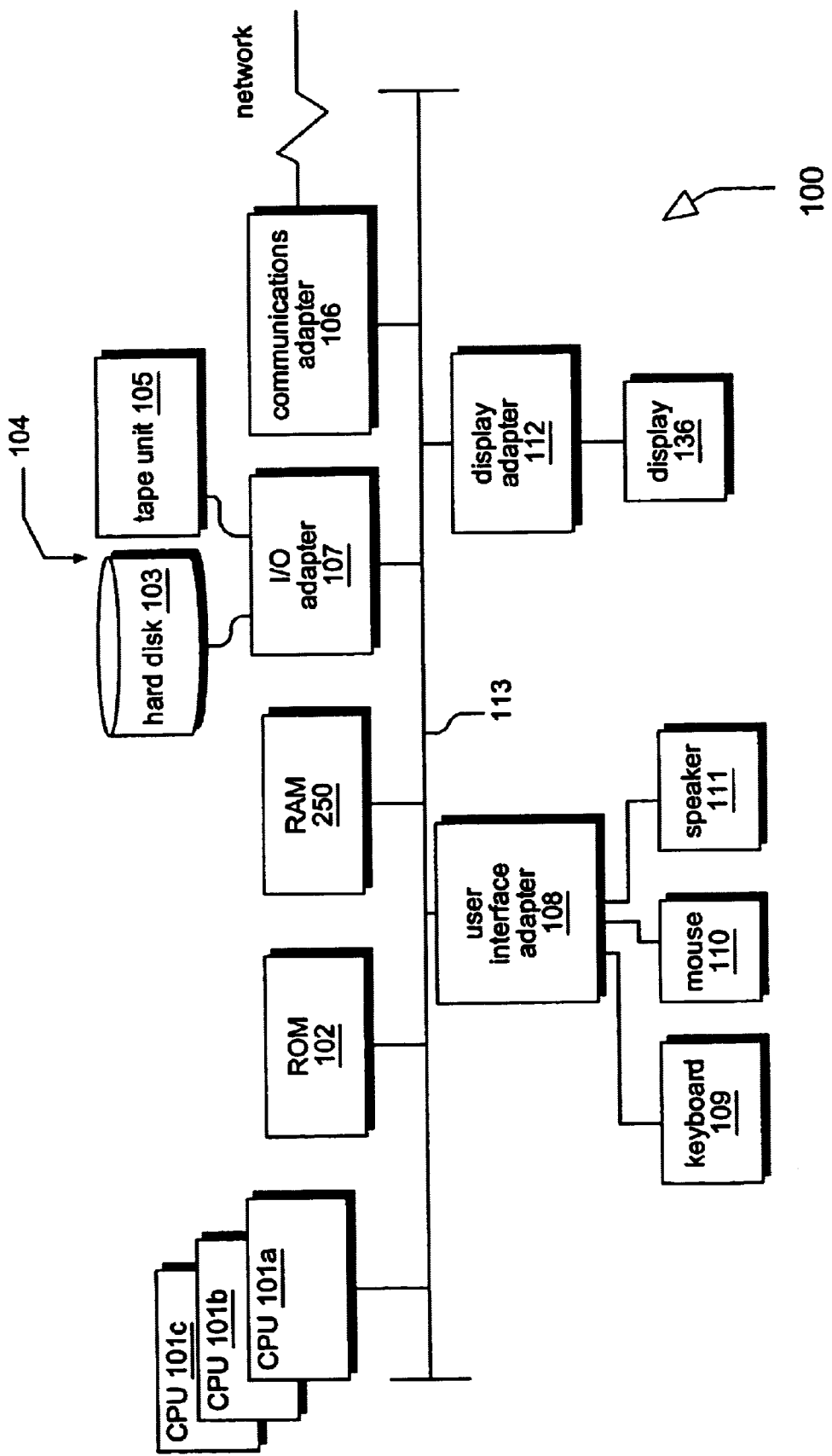
FIG. 1 is a block diagram of a data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Referring now to FIG. 1, an embodiment of a data processing system 100 according to the present invention is depicted. System 100 includes one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors*, (Morgan Kaufmann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 links system bus 113 with mass storage devices 104 such as a hard disk 103 and/or a tape storage drive 105. Network adapter 106 interconnects bus 113 with an external network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus as specified according to PCI Local Bus Specification Rev. 2.2 available from the PCI Special Interest Group, Hillsboro, Oreg., and incorporated by reference herein. Additional input/output devices are shown as connected to system bus 113 via user interface adapter 108. A keyboard 109, mouse 110, and speaker 111 are all linked to bus 113 via user interface adapter 108, which may include, for example, a SuperI/O chip integrating multiple device adapters into a single integrated circuit. For additional information concerning one such chip, the reader is referred to the *PC87338/PC97338 ACPI 1.0 and PC98/99 Compliant SuperI/O* data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation or other suitable operating system to coordinate the functions of the various components shown in FIG. 1. Additional detail concerning the AIX operating system is available in *AIX Version 4.3 Technical Reference: Base Operating System and Extensions, Volumes 1 and 2* (order numbers SC23-4159 and SC23-4160); *AIX Version 4.3 System User's Guide: Communications and Networks* (order number SC23-4122); and *AIX Version 4.3 System User's Guide: Operating System and Devices* (order number SC23-4121) from IBM Corporation at www.ibm.com and incorporated by reference herein.

Figure 2:
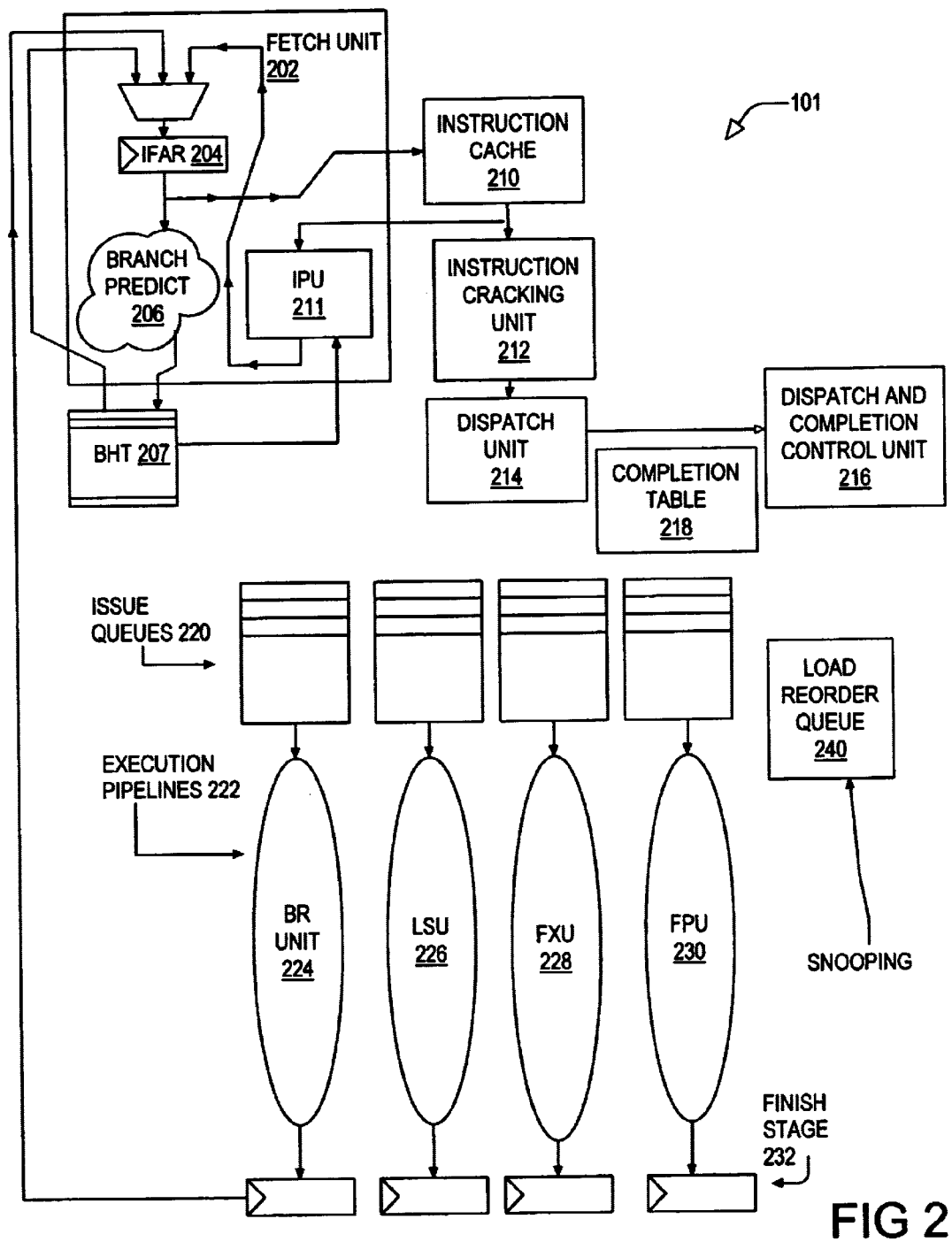
FIG. 2 is a block diagram of a processor for suitable for use in the data processing system of FIG 1.

Turning now to FIG. 2, a simplified block diagram of a processor 101 according to one embodiment of the present invention is illustrated. Processor 101 as depicted in FIG. 2 includes an instruction fetch unit 202 suitable for generating an address of the next instruction to be fetched. The fetched instruction address generated by fetch unit 202 is loaded into an instruction fetch address register (IFAR) 204 and provided to an instruction cache 210. Fetch unit 202 further includes branch prediction logic 206 that is adapted to make an informed prediction of the outcome of a decision that effects the program execution flow. Fetch unit 202 according to the present invention includes additional feature that will be described in greater detail below. The ability to correctly predict branch decisions is a significant factor in the overall ability of processor 101 to achieve improved performance by executing instructions speculatively and out-of-order. The address produced by fetch unit 202 is provided to an instruction cache 210, which contains a subset of the contents of system memory in a high speed storage facility. If the address instruction generated by fetch unit 202 corresponds to a system memory location that is currently replicated in instruction cache 210, instruction cache 210 forwards the corresponding instruction to dispatch unit 214. If the instruction corresponding to the instruction address generated by fetch unit 202 does not currently reside in instruction cache 210, the contents of instruction cache 210 must be updated with the contents of the appropriate locations in system memory before the instruction can be forwarded to dispatch unit 214. In the depicted embodiment, processor 101 includes cracking logic 212 intermediate between instruction cache 210 and dispatch unit 214. Cracking logic 212 is adapted to organize sets of instructions into instructions groups to facilitate dispatch and completion tracking. Additional detail regarding grouped instructions and the function of cracking unit 212 is disclosed in pending U.S. patent application entitled Instruction Group Organization and Exception Handling in a Microprocessor, Ser. No. 09/428,399, filed Oct. 28, 1999, which shares a common assignee with the present application and is incorporated by reference herein.

Before discussing additional detail regarding fetch unit 202, other significant functional units of the depicted embodiment of processor 101 are described. Instructions are forwarded from cracking unit 212 to dispatch unit 214. Dispatch unit 214 is responsible for determining which instructions are capable of being executed and forwarding these executable instructions to issue queues 220. In addition, dispatch unit 214 communicates with dispatch and completion control logic 216 to keep track of the order in which instructions were issued and the completion status of these instructions to facilitate out-of-order execution. In the embodiment of processor 101 in which cracking unit 212 organizes incoming instructions into instruction groups as referenced above, each instruction group is assigned a group tag (GTAG) by completion and control logic 216 that conveys the ordering of the issued instruction groups. As an example, dispatch unit 214 may assign monotonically increasing values to consecutive instruction groups. With this arrangement, instruction groups with lower GTAG values are known to have issued prior to (i.e., are older than) instruction groups with larger GTAG values. In association with dispatch and completion control logic 216, a completion table 218 is utilized in one embodiment of the present invention to track the status of issued instruction groups.

In the embodiment of processor 101 depicted in FIG. 2, instructions are issued from dispatch unit 214 to issue queues 220 where they await execution in corresponding execution pipes 222. Processor 101 may include a variety of types of execution pipes, each designed to execute a subset of the processor's instruction set. In one embodiment, execution pipes 222 may include a branch unit pipeline 224, a load store pipeline 226, a fixed point arithmetic unit 228, and a floating point unit 230. Each execution pipe 222 may comprise two or more pipeline stages. Instructions stored in issue queues 220 may be issued to execution pipes 222 using any of a variety of issue priority algorithms. In one embodiment, for example, the oldest pending instruction in an issue queue 220 that is eligible for execution is the next instruction issued to execution pipes 222. In this embodiment, the GTAG values assigned by dispatch unit 214 are utilized to determine the relative age of instructions pending in the issue queues 220. Prior to issue, the destination register operand of the instruction is assigned to an available rename GPR. When an instruction is ultimately forwarded from issue queues 220 to the appropriate execution pipe, the execution pipe performs the appropriate operation as indicated by he instruction's opcode and writes the instruction's result to the instruction's rename GPR by the time the instruction reaches a finish stage (indicated by reference numeral 232) of the pipeline. A mapping is maintained between the rename GPRs and their corresponding architected registers. When all instructions in an instruction group (and all instructions in older instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If one or more instructions older than a finished (but not yet committed) instruction generates an exception, the instruction generating the exception and all younger instructions are flushed and a rename recovery routine is invoked to return the GPR mapping to the last known valid state.

Figure 3:
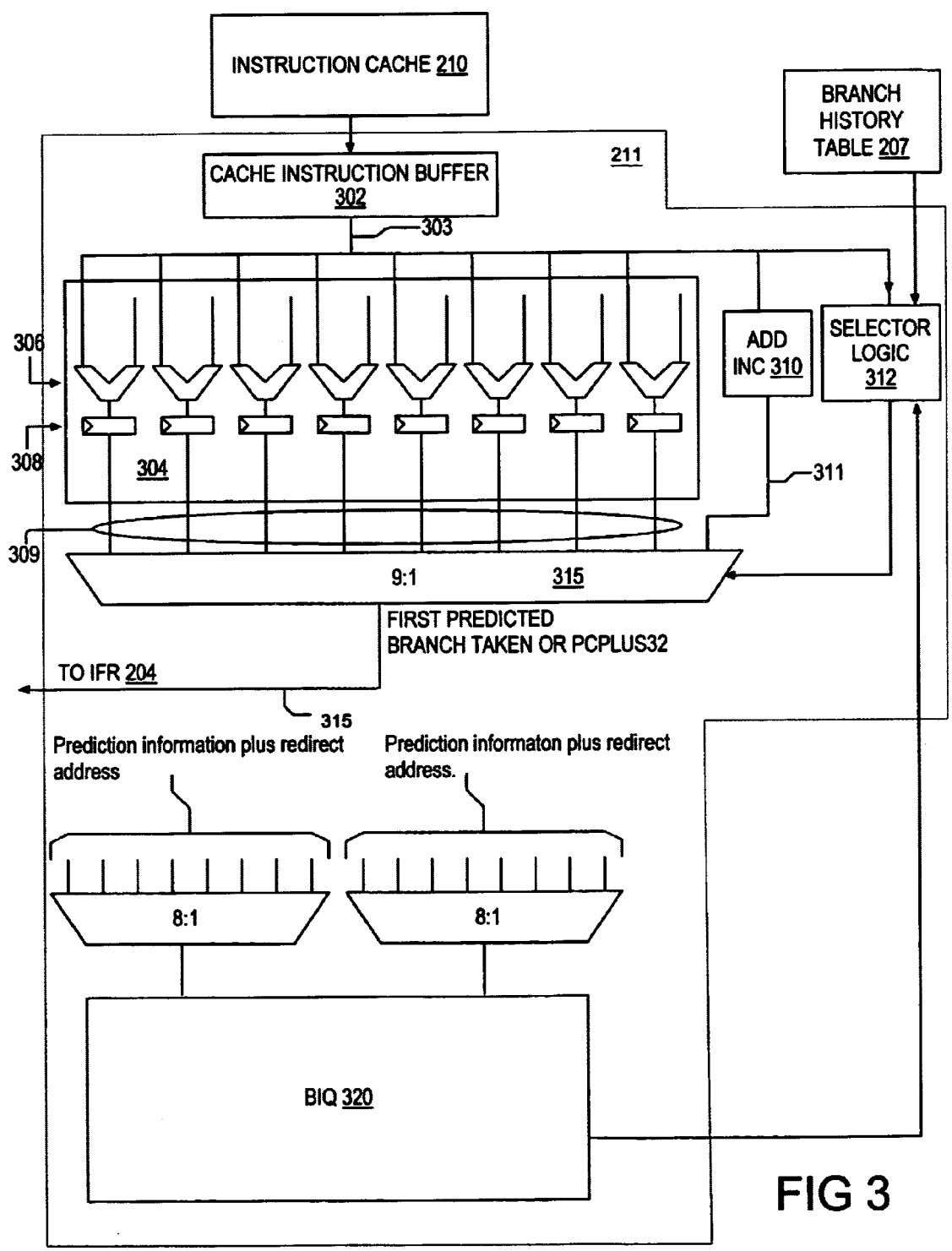
FIG. 3 is a block diagram of an instruction processing unit of the processor of FIG. 2 according to one embodiment of the invention.

Turning now to FIG. 3, additional detail of fetch unit 202 according to one embodiment of the present invention is shown. In the depicted embodiment, fetch unit 202 includes an instruction set processing unit (IPU) 211 including a branch instruction queue (BIQ) 320 that stores information about branch instructions in the event that a branch is mispredicted. IPU 211 includes a cache instruction buffer 302 that buffers the instructions received from instruction cache 210. In one embodiment, each cache line of the instruction cache 210 is organized into four sectors, each of which holds eight 32-bit instructions. Although the depicted embodiment is described with respect to a particular cache architecture, it will be appreciated that the invention is not dependent on the specific architecture of cache 210. IPU 211 includes facilities for receiving the eight instructions comprising a sector when instruction cache 210 is accessed. This set of eight instructions is indicated in FIG. 3 by reference numeral 303. The depicted embodiment of IPU 211 is suitable for determining if it is necessary to send an address to IFAR 204, to redirect the program execution flow, based upon any of the instructions in the set of instructions 303 received from instruction cache 210. If IPU 211 determines that one of the eight instructions affects the next instruction that should be executed, IPU 211 generates the address of the next instruction to be provided to instruction cache 210 and forwards the generated address to IFAR 204. In one embodiment, IPU 211 generates an address that is routed to IFAR 204 if any of the instructions 303 comprises a branch instruction that is predicted to be taken. It will be appreciated that instructions are organized within a cache line sector sequentially and that, in the absence of a taken branch, it is presumed that the next instruction to execute is the next sequential instruction. Thus, the instructions 303 retrieved from instruction cache 210 are sequential instructions. When a branch instruction is predicted to be taken, IPU 211 must forward the instruction of the branch target address to IFAR 204 so that the instructions at the branch target address can be retrieved from instruction cache 210 (or from an L2 cache or system memory (not shown) if the instructions are unavailable in instruction cache 210) in anticipation of their subsequent execution following the execution of the branch instruction assuming that the branch prediction is correct. In one embodiment, IPU 211 generates an address that is sent to IFAR 204 based upon the branch target of the first instruction in the set of instructions 303 that is a branch instruction that is predicted to be taken. The first branch instruction predicted to be taken is significant in that the sequential instructions following this instruction can be discarded since it is anticipated that they will not be executed.

To generate the address (identified by reference numeral 314) that is sent to IFAR 204, IPU 211 includes an address generation unit 304 that includes a set of adders 306 and a corresponding set of latches 308. In the preferred embodiment, there is an adder 306 and a latch 308 for each instruction in the set of instructions 303. The set of adders 306 are configured to generate a branch target address based on the value of the operands of the corresponding instruction. The depicted embodiment of address generation unit 304 generates a set of branch target addresses 309 corresponding to each set of instructions 303 regardless of whether a particular instruction in the set of instructions 303 is a branch instruction. More specifically, address generation unit generates the set of branch target addresses 309 while selector logic 312 is determining which of the instructions 303 are actually branch instructions and which of the branch instructions are branch instructions that are predicted to be taken. Thus, some of the branch target addresses 309 generated by address generation unit 304 are meaningless addresses that do not correspond to a branch instruction.

While address generation unit 304 is generating the set of branch target addresses 309, selector logic 312 determines which instructions, if any, in the set of instructions 303 represents the first branch instruction predicted to be taken. To make this evaluation, selector logic 312 receives each of the set of instructions 303. In addition, selector logic 312 communicates with branch history table 207 or other suitable branch prediction information of processor 101 to determine which, if any, of the set of instructions 303 comprises a predicted taken branch instruction. Based on this information, selector logic 312 determines the first predicted taken branch instruction (if there is one) in the set of instruction 303. A multiplexer 315 receives the set of branch target addresses 309 generated by address generation unit 304 while the output of selector logic 312 provides the select input to multiplexer 315.

In the depicted embodiment, multiplexer 315 is configured to receive an additional address 311 that is generated by an address incrementer 310. Address 311 is passed to IFAR 204 in those cases when BIQ 320 of IPU 211 lacks sufficient resources to record, in a single cycle, all of the branch information in the set of instructions 303 that requires recording. Consider, as an example, a set of instructions that includes three branch instructions, none of which is predicted to be taken. Information concerning the branch target address of these instructions must be recorded to re-direct program execution in the event that one of the branches is mis-predicted (i.e., one of the branches that was predicted as not taken was actually taken). Should the set of instructions contain one or more predicted taken branch instructions, the address of the instruction sequentially following the first predicted taken branch is stored in BIQ 320 to re-direct program execution in the event that the predicted taken branch is not taken. In the depicted embodiment, this re-direct address information is stored in BIQ 320, where it remains pending actual execution when the branch instruction can be evaluated to determine if the branch prediction corresponding to that instruction was correct. In addition to the re-direct address information, the entries in BIQ 320 may further include prediction information. The re-direct address information and the prediction information are collectively referred to herein as BIQ information. In the case of a predicted not taken branch, the redirect address is the target address of the branch instruction while, in the case of a predicted taken branch, the redirect address is the address of the instruction following the branch address (the next sequential instruction address).

If BIQ 320 lacks sufficient resources to record in a single cycle all the branch instruction information requiring recordation, the instruction fetching timing must be interrupted to insure that all the necessary information gets stored in BIQ 320. To insure that this interruption in the instruction fetch mechanism does result in one or more sets of instructions getting "lost" in IPU 211, the depicted embodiment of IPU 211 provides address 311, as generated by address incrementer 310, to mux 315. Address incrementer 310 receives the address of the set of instructions that is currently being processed by address generation unit 304 and produces the next sequential address. If, as an example, the set of instructions 303 comprises eight instructions, the first of which has an instruction address X (in bytes), address generator 310 produces a value of X+8*BPI, where BPI indicates the number of bytes per instruction. In the event that the BIQ 320 lacks sufficient resources to accommodate all the BIQ information contained in the set of instructions 303, selector logic 312 selects the output of address 310 as the output of multiplexer 315 for forwarding to IFAR 204. By providing IFAR 204 with the next sequential address in the case when BIQ 320 lacks sufficient resources to record all BIQ information requiring recordation, the timing delay required to record all of the necessary information into BIQ 320 does not result in a set of instructions that gets lost or consumed in IPU 211.

IPU 211 determines the capacity of BIQ 320 to receive BIQ information in a single cycle. In the depicted embodiment, BIQ 320 is a dual ported storage facility that receives the set of instructions 303 and their corresponding branch target addresses 309 as produced by address generation unit 304. Assuming that BIQ 320 has sufficient available entries, BIQ 320 can thus record BIQ information for up to 2 instructions per cycle. The capacity determination is also limited by the number of available entries in BIQ 320. Thus, in this embodiment, IPU 211 determines the capacity of BIQ 320 to record BIQ information by determining the number of available entries and the number of available ports. If the set of instructions 303 contains 2 or fewer branch instructions (excluding any instructions that follow a predicted taken branch instruction, BIQ 320 can consume all the BIQ information in a single cycle to enable the non-stop operation of the fetching mechanism. If, on the other hand, the set of instructions 303 contains 3 or more instructions requiring recordation in BIQ 320 (or if the set of instructions 303 contains 1 or 2 instructions requiring recordation, but the BIQ lacks sufficient available entries to accommodate these instructions), it would be desirable to simply stop fetch unit 202 from providing a next instruction to instruction cache 210 until all of the BIQ information can be stored in BIQ 320. Unfortunately, in very high speed processors (processors with operating frequencies in excess of 1 GHz) it may not be possible to halt the instruction fetching mechanism in time to maintain sequential instruction flow. When this is the case, the next set of instructions that are being processed (the set of instructions sitting at the inputs of address generation unit 304) may not be processed and stored in BIQ 320 properly. This problem is addressed in part by the incorporation of the set of latches 308 that permits one level of buffering. If the cycle time of the processor is very short, however, even this level of buffering may be insufficient to ensure that all sets of instructions are properly processed. While additional levels of buffering could be added to address generation unit 304 to resolve this issue, the addition of eight (or more) sets of latches that are wide enough to accommodate 32-bit (or wider) instruction formats would, unfortunately, require considerable area. By introducing the next sequential instruction addresses 311 as an input to multiplexer 315 and by designing selector logic 312 to select this additional input when a set of instructions cannot be processed and stored in BIQ 320, the present invention addresses the described timing issue in very high speed microprocessors with a solution that does not add significantly to the size of the device.

It will be apparent to those skilled in the art having the benefit of this disclosure that the present invention contemplates an improved instruction fetch mechanism for a microprocessor. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for determining an instruction fetch address in a microprocessor comprising:
   fetching a set of instructions from an instruction cache;
   determining the number of selected branch instructions in the set of instructions, wherein the selected branch instructions are those branch instructions in the set of instructions for which branch information is to be recorded;
   if the number of selected branch instructions is greater than one, determining the capacity of a branch instruction queue (BIQ) to receive, in a single clock cycle, branch information associated with each of the selected branch instructions; and
   responsive to determining that the BIQ capacity is sufficient to accommodate the number of selected branch instructions:
      storing branch information associated with each selected branch instruction in a corresponding entry of the BIQ; and
      calculating a target address for the first predicted taken branch instruction in the set and using the calculated target address as the address of the next instruction to fetch; and
   responsive to determining that the number of branch instructions exceeds the determined capacity, generating a next instruction address and forwarding the next instruction address to the instruction cache during a current cycle such that instruction fetching from the next instruction address occurs in the next clock cycle.

2. The method of claim 1, wherein determining the number of branch instructions for which branch information must be recorded comprises determining the number of branch instructions preceding and including the first predicted taken branch instruction.

3. The method of claim 1, wherein determining the capacity for receiving the branch instruction information comprises determining the number of available entries in the branch instruction queue and the number of BIQ ports available to record the branch instruction information.

4. The method of claim 1, further comprising calculating a unique target address for every instruction in the set of instructions such that any of the instructions within the instruction set may be a branch instruction.

5. The method of claim 1, wherein the next instruction address comprises the sequential address following an address of the received set of instructions.

6. The method of claim 1, wherein storing branch information for each selected branch instruction is further characterized as storing a redirect address for each selected branch instruction, wherein the redirect address is indicative of a next instruction address to be used in the event of a branch misprediction.

7. An instruction fetch unit in a microprocessor, comprising:
   an instruction fetch address register configured to provide an address to an instruction cache;
   a branch instruction queue suitable for storing branch instruction information;
   an instruction set processing unit (IPU) suitable for receiving a set of instructions from the instruction cache and configured to determine the capacity of the branch instruction queue (BIQ) to receive, in a single microprocessor clock cycle, the branch information associated with multiple selected branch instructions in die set of instructions for which branch information is to be recorded;

wherein the IPU is adapted, upon determining that the BIQ capacity is sufficient, to store the branch information for each of the selected branch instructions in the BIQ, to calculate a target address for the first predicted taken branch instruction in the set of instructions, and to use the calculated target address as the address of the next instruction to fetch; and wherein tile IPU is further adapted, upon determining that the number of branch instructions exceeds the determined capacity, to generate a next instruction address and forward the next instruction address to the instruction cache during a current cycle such that instruction fetching from the next instruction address occurs in the next clock cycle.

8. The processor of claim 7, wherein the IPU includes an address generation unit suitable for generating branch target address for each of the set of received instructions and a multiplexer configured to receive as inputs the resulting set of branch target addresses.

9. The processor of claim 8, wherein the branch instruction information for each selected instruction includes a redirect address indicating a next instruction address in the event of a branch misprediction.

10. Tho processor of claim 9, wherein the address generation unit includes an adder corresponding to each of the received set of instructions, wherein each of the set of adders receives operand information from a corresponding instruction in the set of instructions and generates a branch target address based thereon.

11. The processor of claim 9, wherein the IPU includes an address incrementer suitable for generating a next instruction address corresponding to the next sequential instruction address following the instruction address corresponding to the received set of addresses, wherein the next instruction address comprises an input to the multiplexer.

12. The processor of claim 11, wherein the IPU further includes selector logic adapted to select the next instruction address as the output of the multiplexer if the number of selected branch instructions exceeds the capacity of the BIQ to record the branch instruction information in a single cycle.

13. The processor of claim 12, wherein the selector logic is adapted to select as the output of the multiplexer the branch target address of the first instruction predicted to be taken if the number of selected branch instructions does not exceed the capacity of BIQ to record the branch instruction information in a single cycle.

14. The processor of claim 7, wherein the selected branch instructions comprise branch instructions preceding and including a first predicted taken branch instruction.

15. The processor of claim 7, wherein the IPU generates a branch target address for every instruction in the set of instructions.

16. A data processing system including a microprocessor, memory, input means, and display means, wherein the microprocessor includes an instruction fetch unit, comprising:

an instruction fetch address register configured to provide an address to an instruction cache;

a branch instruction queue suitable for storing branch instruction information, the branch instruction information including a redirect address indicating a next instruction address in the event of a branch misprediction;

an instruction set processing unit (IPU) suitable for receiving a set of instructions from the instruction cache and configured to determine the capacity of the branch instruction queue (BIQ) to receive, in a single microprocessor clock cycle, the branch information associated with multiple selected branch instructions in the set of instructions for which branch information is to be recorded;

wherein the IPU is adapted, upon determining that the BIQ capacity is sufficient, to store the branch information for each of the selected branch instructions in the BIQ, to calculate a target address for the first predicted taken branch instruction in the set of instructions, and to use the calculated target address as the address of the next instruction to fetch; and wherein the IPU is further adapted, upon determining that the number of branch instructions exceeds the determined capacity, to generate a next instruction address and forward the next instruction address to the instruction cache during a current cycle such that instruction fetching from the next instruction address occurs in the next clock cycle.

17. The data processing system of claim 16, wherein the IPU includes an address generation unit suitable for generating branch target address for each of the set of received instructions and a multiplexer configured to receive as inputs the resulting set of branch target addresses.

18. The data processing system of claim 17, wherein the branch instruction information for each selected instruction includes a redirect address indicating a next instruction address in the event of a branch misprediction.

19. The data processing system of claim 18, wherein the address generation unit includes an adder corresponding to each of the received set of instructions, wherein each of the set of adders receives operand information from a corresponding instruction in the set of instructions and generates a branch target address based thereon.

20. The data processing system of claim 18, wherein the IPU includes an address incrementer suitable for generating a next instruction address corresponding to the next sequential instruction address following the instruction address corresponding to the received set of addresses, wherein the next instruction address comprises an input to the multiplexer.

21. The data processing system of claim 20, wherein the IPU further includes selector logic adapted to select the next instruction address as the output of the multiplexer if the number of selected branch instructions exceeds the capacity of the BIQ to record the branch instruction information in a single cycle.

22. The data processing system of claim 21, wherein the selector logic is adapted to select as the output of the multiplexer the branch target address of the first instruction predicted to be taken if the number of selected branch instructions does not exceed the capacity of BIQ to record the branch instruction information in a single cycle.

23. The data processing system of claim 16, wherein the instructions for which branch information must be recorded comprise branch instructions preceding and including a first predicted taken branch instruction.

24. The data processing system of claim 16, wherein the IPU generates a branch target address for every instruction in the set of instructions.

* * * * *

UNITED STATES PATENT AND TRADEMARK OFFICE
CERTIFICATE OF CORRECTION

PATENT NO. : 6,622,236 B1
DATED : September 16, 2003
INVENTOR(S) : Kevin Arthur Chiarot, Brian R. Konigsburg and Dave Stephen Levitan It is certified that error appears in the above-identified patent and that said Letters Patent is hereby corrected as shown below:

<u>Column 8, lines 49-67 and Column 9, lines 1-7,</u>
Claim 7 should read:
7. An instruction fetch unit in a microprocessor, comprising:
an instruction fetch address register configured to provide an address to an instruction cache;
a branch instruction queue suitable for storing branch instruction information;

an instruction set processing unit (IPU) suitable for receiving a set of instructions from the instruction cache and configured to determine the capacity of the branch instruction queue (BIQ) to receive, in a single microprocessor clock cycle, the branch information associated with multiple selected branch instructions in the set of instructions for which branch information is to be recorded;
wherein the IPU is adapted, upon determining that the BIQ capacity is sufficient, to store the branch information for each of the selected branch instructions in the BIQ, to calculate a target address for the first predicted taken branch instruction in the set of instructions, and to use the calculated target address as the address of the next instruction to fetch; and wherein the IPU is further adapted, upon determining that the number of branch instructions exceeds the determined capacity, to generate a next instruction address and forward the next instruction address to the instruction cache during a current cycle such that instruction fetching from the next instruction address occurs in the next clock cycle.

Signed and Sealed this

Twenty-fifth Day of May, 2004

JON W. DUDAS
*Acting Director of the United States Patent and Trademark Office*